(12) United States Patent
Huang et al.

(10) Patent No.: US 10,924,331 B2
(45) Date of Patent: Feb. 16, 2021

(54) CONTROLLER AREA NETWORK COMMUNICATION SYSTEM

(71) Applicant: WeRide Corp., Sunnyvale, CA (US)

(72) Inventors: Kun Huang, Sunnyvale, CA (US); Liren Xu, Sunnyvale, CA (US)

(73) Assignee: WeRide Corp., Sunnyvale, CA (US)

(*) Notice: Subject to any disclaimer, the term of this patent is extended or adjusted under 35 U.S.C. 154(b) by 97 days.

(21) Appl. No.: 16/239,551

(22) Filed: Jan. 4, 2019

(65) Prior Publication Data
US 2019/0215233 A1 Jul. 11, 2019

Related U.S. Application Data

(60) Provisional application No. 62/613,769, filed on Jan. 5, 2018.

(51) Int. Cl.
*H04L 12/24* (2006.01)
*H04L 12/40* (2006.01)
*H04L 12/26* (2006.01)

(52) U.S. Cl.
CPC .......... *H04L 41/0654* (2013.01); *H04L 12/40* (2013.01); *H04L 12/40006* (2013.01); *H04L 12/40176* (2013.01); *H04L 43/0811* (2013.01); *H04L 2012/40215* (2013.01); *H04L 2012/40273* (2013.01)

(58) Field of Classification Search
CPC .............. G06F 11/2005; G06F 11/0793; G06F 11/008; G06F 3/0635; G06F 3/061; G06F 13/20; G06F 13/4282; H04L 12/40; H04L 12/40006; H04L 12/40176; H04L 2012/40215; H04L 2012/40273; H04L 41/0654; H04L 43/0811
See application file for complete search history.

(56) References Cited

U.S. PATENT DOCUMENTS

| 4,417,334 A | * | 11/1983 | Gunderson | ........ H04B 10/2725 370/402 |
| 2004/0078632 A1 | * | 4/2004 | Infante | .................. G06F 3/0613 714/4.2 |
| 2004/0139240 A1 | * | 7/2004 | DiCorpo | ............... G06F 3/0683 710/3 |

(Continued)

*Primary Examiner* — Matthew M Kim
*Assistant Examiner* — Matthew N Putaraksa
(74) *Attorney, Agent, or Firm* — Jun He Law Offices P.C.; James J. Zhu

(57) ABSTRACT

A controller area network (CAN) communication system is provided. The CAN communication system comprises: a CAN bus; at least one electronic control unit (ECU) coupled to the CAN bus; a host module coupled to the CAN bus for controlling the operation of the at least one ECU. The host module comprises: a controller; and at least two adapters coupled between the CAN bus and the controller for communication therebetween. The controller is configured to monitor a communication between a first adapter of the at least two adapters and the CAN bus by a second adapter of the at least two adapters when the controller is communicating with the CAN bus through the first adapter, and to switch its communication with the CAN bus from through the first adapter to through the second adapter when a failure of the communication between the first adapter and the CAN bus is determined.

16 Claims, 1 Drawing Sheet

(56) References Cited

U.S. PATENT DOCUMENTS

| | | | |
|---|---|---|---|
| 2006/0015770 A1* | 1/2006 | Dicorpo | G06F 11/2053 |
| | | | 714/5.1 |
| 2007/0050568 A1* | 3/2007 | Elliott | H04L 67/1097 |
| | | | 711/154 |
| 2007/0058528 A1* | 3/2007 | Massa | H04L 69/40 |
| | | | 370/218 |
| 2009/0034971 A1* | 2/2009 | Sadanada | H04Q 11/0062 |
| | | | 398/49 |
| 2009/0231123 A1* | 9/2009 | Rowell | G05B 23/027 |
| | | | 340/532 |
| 2009/0327780 A1* | 12/2009 | Dawkins | G06F 3/0683 |
| | | | 713/323 |
| 2011/0004783 A1* | 1/2011 | Massa | H04L 41/0654 |
| | | | 714/4.1 |
| 2013/0262949 A1* | 10/2013 | Rayner | H04L 1/22 |
| | | | 714/748 |
| 2015/0169418 A1* | 6/2015 | Cardona | G06F 11/2005 |
| | | | 714/4.11 |
| 2018/0123923 A1* | 5/2018 | Zhou | H04L 43/0858 |
| 2018/0159870 A1* | 6/2018 | Tanabe | H04L 63/0254 |
| 2019/0206148 A1* | 7/2019 | Schroter | G07C 5/008 |

* cited by examiner

CONTROLLER AREA NETWORK COMMUNICATION SYSTEM

CROSS REFERENCE

This application claims the benefit of prior-filed, U.S. Provisional Application No. 62/613,769, filed Jan. 5, 2018, the entire contents of which are hereby incorporated by reference.

TECHNICAL FIELD

The present application relates generally to a controller area network (CAN), and more particularly to a CAN communication system.

BACKGROUND

Controller Area Network (CAN) bus is a type of serial network bus widely used in industrial automation, e.g. in automobile industry. For an autonomous vehicle equipped with a CAN bus, its operations such as braking steering and shifting are generally controlled by a host side via a CAN adapter attached to the host side. The autonomous vehicle may lose control of the operations if the single CAN adapter of the host side encounters a failure. Thus, there is a continued need for further improvements.

SUMMARY

An objective of the present application is to provide a CAN bus communication system which has higher reliability. In particular, a master and slave adapters are used in a host module for the communication between the host module and the CAN bus. When the master adapter used for data exchange between the host module and the CAN bus encounters a failure, the slave adapter, which was used for monitoring the master adapter, may take over the function of the master adapter for data exchange. Therefore, according to the technical solution of the present application, the host module may still be able to transmit data normally when one adapter fails, thereby improving the reliability of the CAN bus communication system.

In a first aspect, a controller area network (CAN) communication system is provided. The CAN communication system comprises: a CAN bus; at least one electronic control unit (ECU) coupled to the CAN bus; a host module coupled to the CAN bus for controlling the operation of the at least one ECU. The host module comprises: a controller; and at least two adapters coupled between the CAN bus and the controller for communication therebetween. The controller is configured to monitor a communication between a first adapter of the at least two adapters and the CAN bus by a second adapter of the at least two adapters when the controller is communicating with the CAN bus through the first adapter, and to switch its communication with the CAN bus from through the first adapter to through the second adapter when a failure of the communication between the first adapter and the CAN bus is determined.

In a second aspect, a vehicle comprising a controller area network (CAN) communication system is provided. The CAN communication system comprises: a CAN bus; at least one electronic control unit (ECU) coupled to the CAN bus; a host module coupled to the CAN bus for controlling the operation of the at least one ECU. The host module comprises: a controller; and at least two adapters coupled between the CAN bus and the controller for communication therebetween. The controller is configured to monitor a communication between a first adapter of the at least two adapters and the CAN bus by a second adapter of the at least two adapters when the controller is communicating with the CAN bus through the first adapter, and to switch its communication with the CAN bus from through the first adapter to through the second adapter when a failure of the communication between the first adapter and the CAN bus is determined.

In a third aspect, a method for controlling communication in a controller area network (CAN) communication system is provided. The CAN communication system comprises a host module coupled to a CAN bus for controlling the operation of at least one electric control unit (ECU) coupled to the CAN bus, and the host module comprises a controller which is coupled to the CAN bus through at least two adapters. The method comprises: monitoring a communication between a first adapter of the at least two adapters and the CAN bus by a second adapter of the at least two adapters when the controller is communicating with the CAN bus through the first adapter; determining a failure of the communication between the first adapter and the CAN bus; and switching the communication between the controller and the CAN bus from through the first adapter to through the second adapter.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the present application. It should be understood that, the various aspects of the present application described and graphically presented herein may be arranged, replaced, combined, divided and designed in many different configurations, and these different configurations are implicitly included in the present application.

Figure 1:
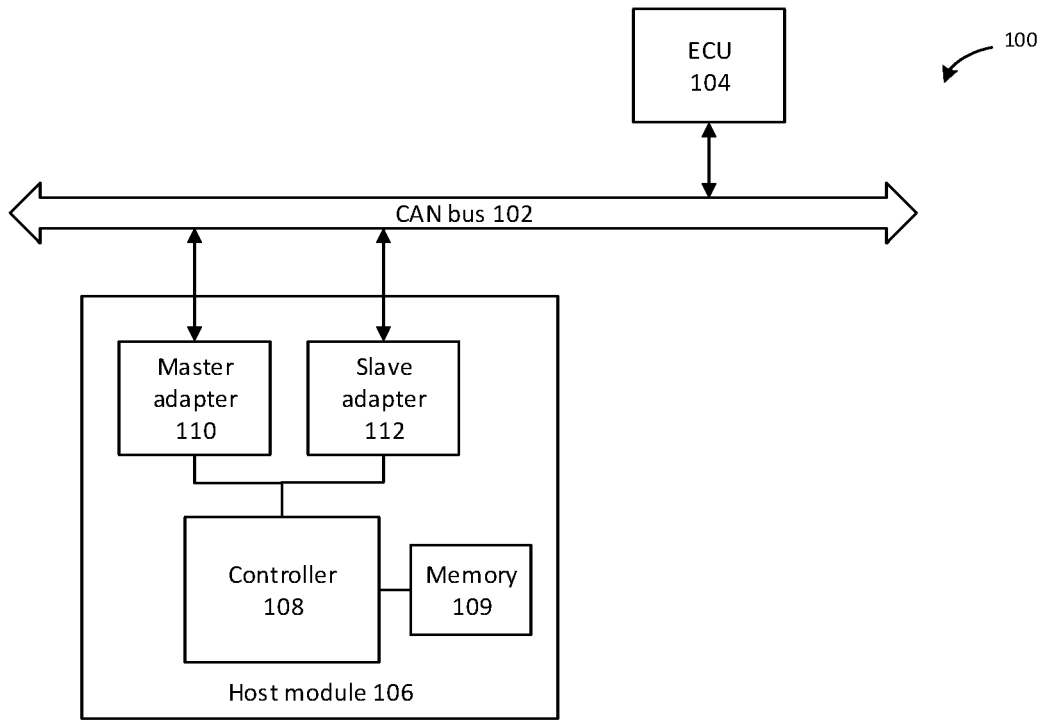
FIG. 1 illustrates a controller area network (CAN) communication system 100 according to one embodiment of the present application.

FIG. 1 illustrates a controller area network (CAN) communication system 100 according to one embodiment of the present application. As illustrated in FIG. 1, the CAN communication system 100 includes a CAN bus 102, and at least one electronic control unit (ECU, also known as a node) 104 connected to the CAN bus 102 for communicating over the CAN bus 102. It can be appreciated by a person skilled in the art that data and signals transmitted by a node can be received by all the other nodes connected to the CAN bus 102, whether the other nodes are simple I/O devices or complex embedded computers with a CAN interface and sophisticated software. In addition, a host module 106 is coupled to the CAN bus 102 for controlling the operation of the at least one ECU 104. It can be appreciated by a person skilled in the art that the host module 106 is also a node connected to the CAN bus 102, and thus in some embodiments the structure and function of the host module 106 which will be detailed below can also be implemented in any one of the ECUs connected to the CAN bus 102. It should be noted that, although only one ECU 104 is illustrated in FIG. 1, another one or more ECUs can be coupled to the CAN bus 102.

In some embodiments, the CAN communication system 100 can have various applications. For example, the CAN communication system 100 may be incorporated into an automobile, a ship, a medical equipment, or other industrial devices or home appliances which all have a variety of ECUs that need communication with each other. When the CAN communication system 100 is used in an automobile, the at least one ECU 104 may include an engine control unit, a transmission unit, an airbag unit, an antilock braking unit, an electric power steering unit, and any other subsystems that can be equipped in the automobile.

With continued reference to FIG. 1, the host module 106 includes a controller 108 for exchanging data over the CAN bus 102 and a memory 109 for storing instructions executable by the controller 108. In this way, the controller can generate various processes for controlling the ECUs 104. The host module 106 further includes a master adapter 110 and a slave adapter 112 both coupled between the controller 108 and the CAN bus 102. The two adapters 110 and 112 provide two parallel paths for data and signal communication between the controller 108 and the CAN bus 102. It can be appreciated that the master adapter 110 is a first adapter of at least two adapters, and the slave adapter 112 is a second adapter of the at least two adapters. In one embodiment, the controller 108 communicates with the CAN bus 102 through the master adapter 110 in default. When the controller 108 is in communication with the CAN bus 102 through the master adapter 110, data and signal transmitted from the controller 108 to the CAN bus 102, can return to the controller 108 through the slave adapter 112, in addition to being delivered to the other nodes coupled to the CAN bus 102. That is, the slave adapter 112 functions as an interface coupled to the CAN bus 102, just similar to the interfaces used in other ECUs 104. Therefore, the controller 108 can monitor, via the slave adapter 112, its own communication with the CAN bus 102 through the master adapter 110. In some embodiments, the controller 108 can determine a failure of the master adapter 110 when the master adapter 110 encounters a hardware failure or is in a bad connection with the CAN bus 102. In one embodiment, the controller 108 can monitor, via the slave adapter 112, a status parameter of data transmitted by itself through the master adapter 110. In one embodiment, when the data being received through the slave adapter 112 is not within a responsive range, e.g. 100-500 ms, a failure of the communication between the controller 108 and the CAN bus 102 through the master adapter 110 may be determined. In another embodiment, the failure may also be detected when it's determined that the data transmitted by the controller 108 through the master adapter 110 is not at a predetermined data transmission rate, e.g. 50 Hz. The predetermined data rate can be in accordance with the CAN bus standard or protocol, or any other data rate preset by a user or provider of the CAN bus communication system 100.

When the failure of communication between the controller 108 and the CAN bus 102 through the master adapter 110 is determined or identified, the controller 108 may send a request to the master adapter 110 for transferring a control over the communication between the controller 108 and the CAN bus 102 to the slave adapter 112. In response to the request, the master adapter 110 may actively release its control over the communication between the controller 108 and the CAN bus 102, and meanwhile the slave adapter 112 may take over the control for the communication. In some embodiments, in the circumstances where the master adapter 110 fails to respond the request, the controller 108 may send another request to the slave adapter 112 to take over the communication control actively. However, in another embodiment, when the failure of the master adapter 110 is determined, the controller 108 may transfer the communication control from the master adapter 110 to the slave adapter 112 without sending a request to the master adapter 110. In this way, the communication between the controller 108 and the CAN bus 102 can be switched from through the master adapter 110 to through the slave adapter 112, when a failure of the communication between the controller 108 and the CAN bus 102 through the master adapter 110 is determined.

In some embodiments, the slave adapter 112 may have the same function as that of the master adapter 110. For example, the master and slave adapters may have substantially the same hardware and software configuration. Accordingly, when the master adapter 110 is recovered from the failure, the slave adapter 112 can continue working as the interface between the controller 108 and the CAN bus 102, rather than giving the control back to the master adapter 110. Accordingly, the master adapter 110 can be alternatively used for monitoring the communication between the controller 108 and the CAN bus 102 through the slave adapter 112. Moreover, in some other embodiments, the slave adapter may not be as capable or complex as the master adapter, for example, in consideration of the cost of the system. Accordingly, some functionalities of the master adapter 110 may be missing from the slave adapter 112. For example, the functionalities of the slave adapter 112 may be a subset of the functionalities of the master adapter 110. Accordingly, when the master adapter 110 is recovered from the failure, the master adapter 110 may take over the control over the communication between the controller 108 and the CAN bus 102 again. Correspondingly, the slave adapter 112 may continue its monitoring function.

It can be understood that in some cases the slave adapter 112 may also fail due to various reasons, which may cause that the monitoring function of the slave adapter 112 does not work. In some embodiments, another slave adapter (not shown) may be coupled between the CAN bus 102 and the controller 108 to monitor the operation of the master adapter 110 as a backup of the slave adapter 112. The function and operation of the another slave adapter can be similar to the slave adapter 112 and thus will not elaborated herein. In some alternative embodiments, another slave adapter (not shown) may be coupled between the CAN bus 102 and the controller 108 to monitor the operation of the slave adapter 112. If any failure occurs to the slave adapter 112 is identified, the controller 108 may send a request to the slave adapter 112 for reset of the slave adapter 112. For example, the controller 108 may send data through the slave adapter 112 at a predetermined data transmission rate (e.g. 50 Hz or any other rates greater or less than 50 Hz), and then detect or determine whether the data received through the another slave adapter is also at the predetermined data transmission rate. When the data being received through the another slave adapter is not at the predetermined data transmission rate, it can be determined that the slave adapter 112 fails and may be reset accordingly. It can be appreciated by a person skilled in the art that other parameters e.g. responsive range can be used for monitoring the slave adapter 112.

It can be appreciated that, in the embodiment as illustrated in FIG. 1, the controller 108 may execute instructions stored in the memory 109, so as to control the switch between the master adapter 110 and the slave adapter 112 directly. In other words, the switch operation between the master adapter 110 and the slave adapter 112 can be software-implemented operations. Actually, the switch operation can also be hardware-implemented.

Figure 2:
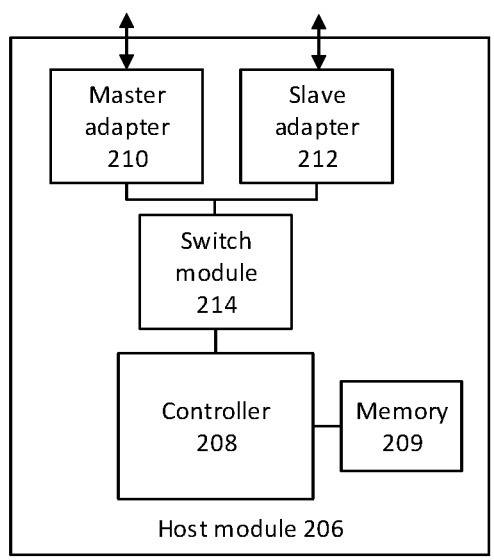
FIG. 2 illustrates an exemplary host module 206 according to another embodiment of the present application.

FIG. 2 illustrates an exemplary host module 206 according to another embodiment of the present application. Similar to the host module 106 as illustrated in FIG. 1, the host module 206 includes a controller 208, a memory 209, and a master adapter 210 and a slave adapter 212. Comparatively, the host module 206 further includes a switch module 214, which is coupled between the controller 208 and the master and slave adapters 210, 212 for selecting one of the master and slave adapters 210, 212 for the data or signal exchange between the controller 208 and a CAN bus.

Similar to the controller 108 shown in FIG. 1, the controller 208 may communicate with the CAN bus through the master adapter 210 in default, and monitor the communication via the slave adapter 212. However, as distinguished from the embodiment described with reference to FIG. 1, when a failure of the communication between the controller 208 and the CAN bus through the master adapter 210 is determined or identified, the controller 208 may send an instruction to the switch module 214, the instruction can instruct the switch module 214 to switch the communication between the controller 208 and the CAN bus from through the master adapter 210 to through the slave adapter 212.

Similarly, when the failure of communication between the controller 208 and the CAN bus through the master adapter 210 is determined, the switch module 214 may send a request to the master adapter 210 for transferring a control over the communication between the controller 208 and the CAN bus to the slave adapter, after receiving the instruction from the controller 208. In response to the request, the master adapter 210 may actively release its control over the communication between the controller 208 and the CAN bus, and meanwhile the slave adapter 212 may take over the control for the communication. In some embodiments, in the circumstances where the master adapter 210 fails to respond the request, the switch module 214 may send another request to the slave adapter 212 to take over the communication control actively. However, in another embodiment, when the failure of the master adapter 110 is determined, the switch module 108, upon receiving an instruction from the controller 208, may transfer the communication control from the master adapter 210 to the slave adapter 212 without sending a request to the master adapter 210.

It can be appreciated by a person skilled in the art that the host module 206 may have the functionalities substantially the same as that of the host module 106, although the host module 206 utilizes the hardware-implemented switch module 214, which is physically separated from the controller 208, to switch the adapter for its own communication with the CAN bus. Accordingly, the operations and functionalities realized by the host module 106 as described above with reference to FIG. 1 can also be incorporated into the host module 206, and thus the description for operations and functionalities of the host module 206 will not be elaborated herein.

Compared with conventional systems, the CAN bus communication system according to the embodiments of the present application has higher reliability. In particular, when the master adapter used for communication between the host module and the CAN bus encounters a failure, the slave adapter, which was used for monitoring the master adapter, may take over the function of the master adapter for communication. Therefore, the host module may still be able to transmit data normally when one adapter fails, thereby improving the reliability of the CAN communication system.

One additional example that follows.

A method for controlling communication in a controller area network (CAN) communication system is provided. The CAN communication system comprises a host module coupled to a CAN bus for controlling the operation of at least one electric control unit (ECU) coupled to the CAN bus, and the host module comprises a controller which is coupled to the CAN bus through at least two adapters. The method comprises: monitoring a communication between a first adapter of the at least two adapters and the CAN bus by a second adapter of the at least two adapters when the controller is communicating with the CAN bus through the first adapter; determining a failure of the communication between the first adapter and the CAN bus; and switching the communication between the controller and the CAN bus from through the first adapter to through the second adapter.

In such a method, the switching the communication between the controller and the CAN bus from through the first adapter to through the second adapter comprises: generating by the second adapter an interrupt request in response to the failure of the communication between the first adapter and the CAN bus; transmitting by the second adapter the interrupt request to the first adapter; and interrupting the communication between the controller and the CAN through the first adapter in response to the first adapter receiving the interrupt request.

Such a method further includes: switching the communication between the controller and the CAN bus from through the second adapter to through the first adapter when it's monitored that the first adapter is recovered from the failure.

Such a method further includes: maintaining the communication between the controller and the CAN bus through the second adapter when it's monitored that the first adapter is recovered from the failure.

In such a method, determining the failure of the communication between the first adapter and the CAN bus comprises: monitoring, by the second adapter, at least one status parameter of a data stream transmitted from the first adapter; and determining an existence of the failure of the communication when the data stream transmitted from the first adapter is not within a responsive range Those skilled in the art may understand and implement other variations to the disclosed embodiments from a study of the drawings, the present application, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. A controller area network (CAN) communication system, comprising:
   a CAN bus;
   at least one electronic control unit (ECU) coupled to the CAN bus;
   a host module coupled to the CAN bus for controlling the operation of the at least one ECU; wherein the host module comprises:
      a controller;
      at least two adapters coupled between the CAN bus and the controller for communication therebetween, wherein the at least two adapters include a first adapter and a second adapter, and wherein a data stream transmitted from the controller to the CAN bus through the first adapter is transmitted back to the controller through the second adapter; and
      wherein the controller is configured to monitor at least one status parameter of the data stream transmitted through the first adapter to the CAN bus by monitoring the data stream transmitted from the CAN bus back to the controller through the second adapter, and to switch its communication with the CAN bus from through the first adapter to through the second adapter when a failure of the communication between the first adapter and the CAN bus is determined.

2. The system according to claim 1, the host module further comprising:
   a switch module coupled between the at least two adapters and the controller for selecting one of the at least two adapters for the communication between the controller and the CAN bus.

3. The system according to claim 2, wherein the switch module is configured to switch the communication between the controller and the CAN bus from through the first adapter to through the second adapter when a failure of the communication between the first adapter and the CAN bus is determined.

4. The system according to claim 3, wherein the switch module is configured to perform the switch action in response to an instruction received from the controller, the instruction being generated when a failure of the communication between the first adapter and the CAN bus is determined.

5. The system according to claim 1, wherein the controller is further configured to switch its communication with the CAN bus from through the second adapter to through the first adapter when it's monitored that the first adapter is recovered from the failure.

6. The system according to claim 1, wherein the controller is further configured to maintain its communication with the CAN bus through the second adapter when it's monitored that the first adapter is recovered from the failure.

7. The system according to claim 1, wherein the failure of the communication between the first adapter and the CAN bus comprises a hardware failure of the first adapter, or a disconnection between the first adapter and the CAN bus.

8. The system according to claim 1, wherein the controller is further configured to determine the failure of the communication between the first adapter and the CAN bus by
   monitoring, through the second adapter, at least one status parameter of a data stream transmitted from the first adapter; and
   determining an existence of the failure of the communication when the data stream transmitted from the first adapter is not within a responsive range.

9. The system according to claim 8, wherein the response range is 100-500 ms.

10. The system according to claim 1, wherein the at least one ECU comprises one or more of a group consisting of an engine control unit, a transmission unit, an airbag unit, an antilock braking unit, and an electric power steering unit.

11. A vehicle comprising a controller area network (CAN) communication system, wherein the CAN communication system comprises:
    a CAN bus;
    at least one electronic control unit (ECU) coupled to the CAN bus;
    a host module coupled to the CAN bus for controlling the operation of the at least one ECU; wherein the host module comprises:
       a controller;
       at least two adapters coupled between the CAN bus and the controller for communication therebetween, wherein the at least two adapters include a first adapter and a second adapter, and wherein a data stream transmitted from the controller to the CAN bus through the first adapter is transmitted back to the controller through the second adapter; and
       wherein the controller is configured to monitor at least one status parameter of the data stream transmitted through the first adapter to the CAN bus by monitoring the data stream transmitted from the CAN bus back to the controller through the second adapter, and to switch its communication with the CAN bus from through the first adapter to through the second adapter when a failure of the communication between the first adapter and the CAN bus is determined.

12. A method for controlling communication in a controller area network (CAN) communication system, wherein the CAN communication system comprises a host module coupled to a CAN bus for controlling the operation of at least one electric control unit (ECU) coupled to the CAN bus, and the host module comprises a controller which is coupled to the CAN bus through at least two adapters, wherein the at least two adapters include a first adapter and a second adapter, and wherein a data stream transmitted from the controller to the CAN bus through the first adapter is transmitted back to the controller through the second adapter, the method comprising:
    monitoring at least one status parameter of the data stream transmitted through the first adapter to the CAN bus by monitoring the data stream transmitted from the CAN bus back to the controller through the second adapter;
    determining a failure of the communication between the first adapter and the CAN bus; and
    switching the communication between the controller and the CAN bus from through the first adapter to through the second adapter.

13. The method according to claim 12, wherein the switching the communication between the controller and the CAN bus from through the first adapter to through the second adapter comprises:
- generating by the second adapter an interrupt request in response to the failure of the communication between the first adapter and the CAN bus;
- transmitting by the second adapter the interrupt request to the first adapter; and
- interrupting the communication between the controller and the CAN bus through the first adapter in response to the first adapter receiving the interrupt request.

14. The method according to claim 12, further comprises:
- switching the communication between the controller and the CAN bus from through the second adapter to through the first adapter when it's monitored that the first adapter is recovered from the failure.

15. The method according to claim 12, further comprises:
- maintaining the communication between the controller and the CAN bus through the second adapter when it's monitored that the first adapter is recovered from the failure.

16. The method according to claim 12, wherein determining the failure of the communication between the first adapter and the CAN bus comprises:
- monitoring, by the second adapter, at least one status parameter of a data stream transmitted from the first adapter; and
- determining an existence of the failure of the communication when the data stream transmitted from the first adapter is not within a responsive range.

\* \* \* \* \*